R. HUFF.
VEHICLE BRAKE.
APPLICATION FILED OCT. 14, 1912.
1,092,531.
Patented Apr. 7, 1914.
2 SHEETS—SHEET 1.
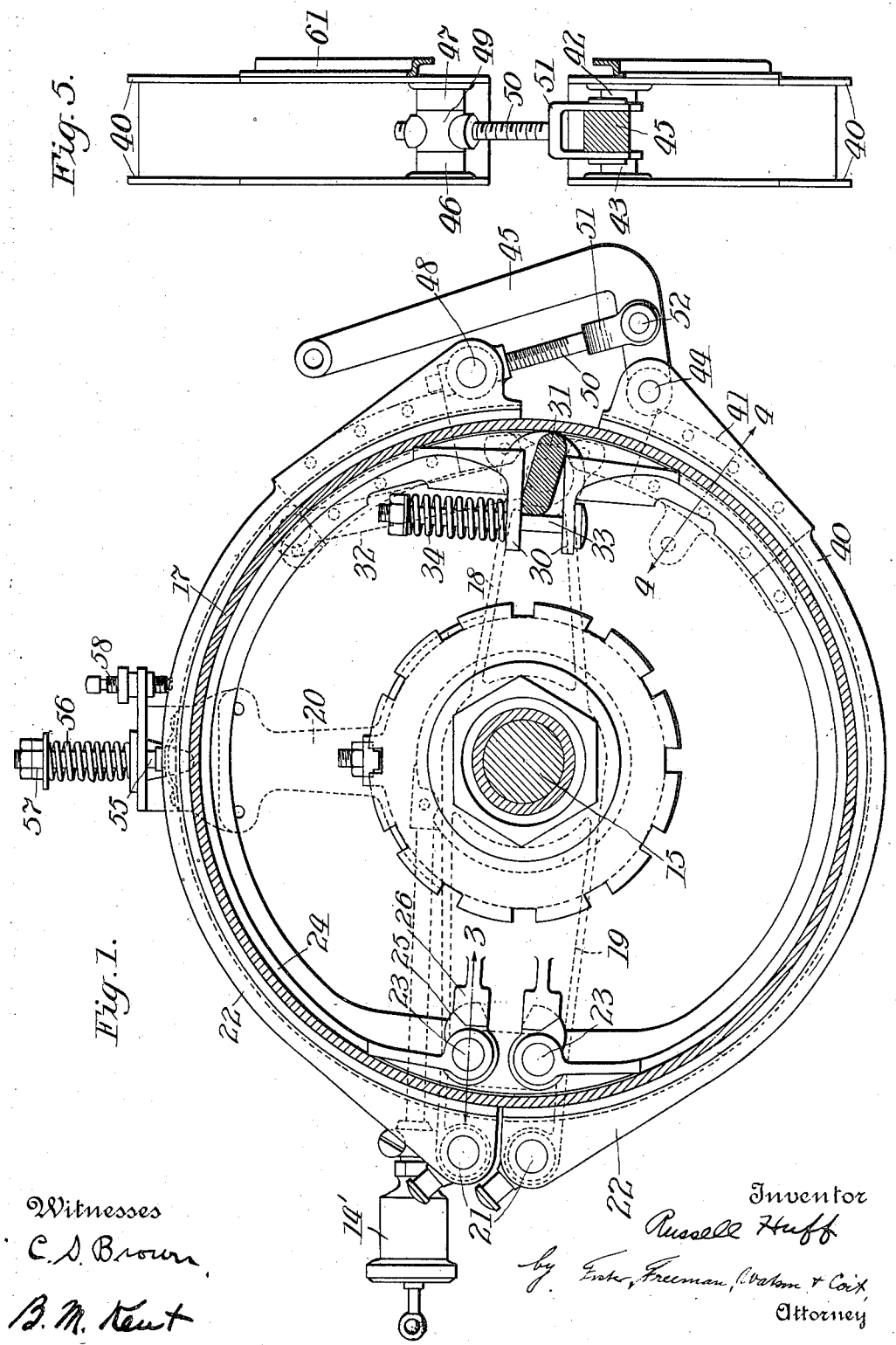

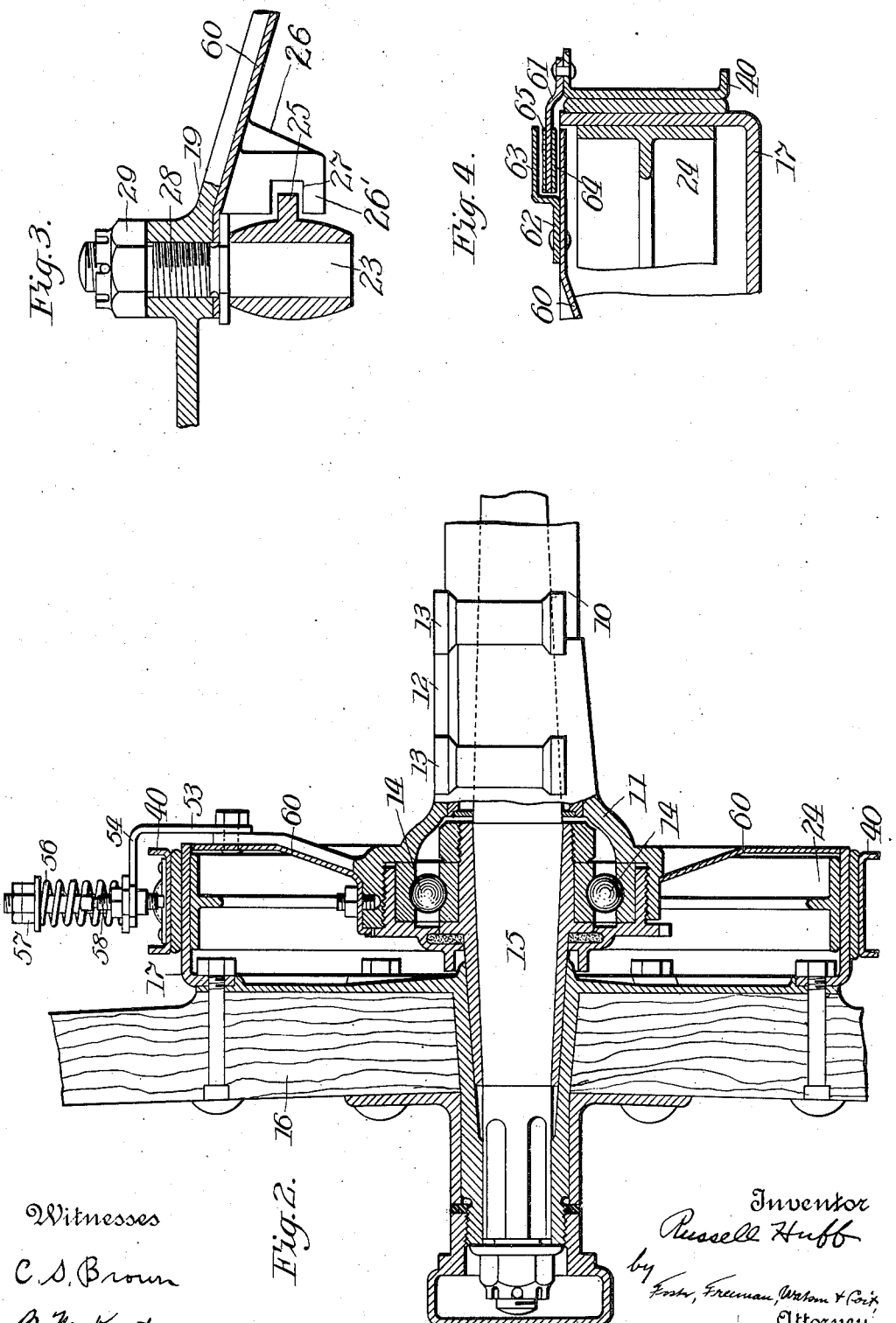

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

VEHICLE-BRAKE.

1,092,531.     Specification of Letters Patent.     Patented Apr. 7, 1914.

Original application filed July 16, 1909, Serial No. 507,940. Divided and this application filed October 14, 1912. Serial No. 725,757.

*To all whom it may concern:*

Be it known that I, RUSSELL HUFF, a citizen of the United States, and resident of Detroit, Wayne county, State of Michigan, have invented certain new and useful Improvements in Vehicle-Brakes, of which the following is a specification.

This application is a division of my application, Serial Number 507,940, filed July 16th 1909.

This invention relates to motor vehicle brakes, and in particular to brakes of the type described in patent to Schmidt 824,151 June 26th 1906.

The objects of this invention are to improve in general the construction of the brake, to provide means whereby it is insured that the shoes will be moved out of engagement with the coöperating brake drum, to provide a construction whereby the shoes may be readily removed, and to provide an anti-rattling device for the brake shoes.

The invention broadly stated consists in a brake drum which is adapted to be secured to the vehicle wheel, and inner and outer brake shoes which are arranged to be moved into braking engagement with the opposite sides of the drum. The upper outer brake shoe is provided with a spring for moving it out of engagement with the drum. An adjustable stop is also provided to limit this movement. The outer brake shoes are provided with integral flanges which are widened at the ends, and pivot pieces are brazed to these widened portions which receive the pivots for the toggle mechanism. The shoes are provided with segmental plates which extend inwardly toward the center of the brake drum. The support is provided with off-set plates forming slots or sockets and the plates are lined with leather or any other noise deadening material. The segmental plates enter these sockets and are engaged loosely by the walls thereof. In this way an anti-rattling device is provided. The inner brake shoes are extended inwardly forming lugs, which are engaged by a spreading cam to spread the inner shoes and move them into braking engagement with the drum. A bolt extended through these lugs has a spring mounted upon it to normally move the shoes into disengaging position.

The brake shoes are mounted upon their pivots for endwise removal and are provided with lugs which coöperate with recesses formed in the support. The lugs and recesses are in engagement when the brake shoes are in operative position; but when the drum is removed and the brake shoes are swung outwardly the lugs move out of engagement with the recesses and permit the endwise removal of the shoes from their pivots.

In the drawings: Figure 1 is an elevation of the brake showing the drum in section; Fig. 2 is a vertical section through the wheel and brake drum; Fig. 3 is a section on the line 3 of Fig. 1; and Fig. 4 is a section on the line 4—4 of Fig. 1. Fig. 5 is a front elevation of the outer brake shoes, parts of the mechanism being shown in section.

Referring to the drawings, 10 designates the stationary rear axle tube which has firmly secured to it the bracket or support 11, the upper flat portion 12 of which forms the spring seat, bosses 13 being provided for the spring shackles. In the outer end of the support 11 is the annular ball-bearing 14 for the outer end of the driving axle 15. A grease cup 14' is provided for the ball bearing 14. The rear driving wheel 16 is suitably keyed to the end of the axle section 15 in the usual manner. The brake drum 17 is secured to the rear wheel and forms inner and outer braking surfaces. Upon the bracket 11 are mounted three arms 18, 19 and 20. The arm 19 forms the anchor for the brake shoes and has mounted thereon a pair of pivots 21 for the outer brake shoes 22, which form the outer brake band, and a pair of pivots 23 for the inner brake shoes 24, which form the inner brake band. The brake shoes 24 are mounted for endwise movement on the pivots 23, and are provided with lugs 25 which engage recesses 27 formed in projections 26 mounted upon the bracket 19. When the brake shoes are in operative position with the lugs 25 engaging the recesses, the lugs 26', which are produced due to the formation of the recesses 27, prevent the endwise removal of the brake shoes. The pivots 23 are secured to the bracket 19 in the manner shown in Fig. 3, these pivots being provided with threaded shanks 28 upon which are screwed lock nuts 29. The brake shoes are provided with inturned lugs 30 engaged by a spreading cam 31 which is operated through a lever 32 connected to the brake operating lever. A bolt 33 extends through the lugs and has mounted upon it a spring 34 which moves the shoes out of engagement with the drum.

When the drum 17 and the outer brake shoes 22 are removed, the inner brake shoes may be swung on their pivots until the lugs 25 move out of engagement with the recesses 27 thereby permitting the brake shoes to be removed from the pivots 23 by an endwise movement. By means of this construction the usual nuts and cotter pins are dispensed with. It will be seen that the coöperating lug 25 and recess 27 form a bayonet joint.

The outer brake shoes 22 may be steel stampings and are provided with side flanges 40 which flanges are widened at the ends as shown at 41. Pivot pieces 42, 43 are brazed to the flange portions 41 of the lower shoe and are centrally bored to receive a pivot pin 44 extending through the lever 45, which forms one of the links of the toggle mechanism and which is connected with the brake operating lever. The upper brake shoe is similarly provided with pivot pieces 46, 47, brazed thereto and centrally bored to receive a pivot pin 48 provided with a transverse hole. A nut 49 is mounted upon the pivot pin 48 and is provided with a threaded portion to receive the shank 50 of the other toggle link 51, which is pivotally connected to the lever 45 at 52. The pivot pin 48 is held in place by means of the shank 50 which extends through the transverse hole formed therein. By means of this construction the brake shoes 22 may be adjusted.

The arm 20 is provided with a bracket 53 having an overhanging portion 54. A bolt 55 is connected to the upper brake shoe near its middle, extends through the overhanging portion 54 and is provided with lock nuts 57. A spring 56 is mounted upon the bolt between the nuts and the overhanging portion 54 and normally tends to hold the upper brake shoe out of engagement with the drum. An adjustable stop 58 limits the upward movement of the brake shoe. When the lever 45 moves the brake shoes away from the drum the upper brake shoe will be moved out of engagement until it meets the stop 58, and thereafter the power is all transmitted to move the lower brake shoe out of engagement. The above construction therefore insures that both brake shoes are moved out of engagement. If the adjustable stop 58 is not provided the upper brake shoe may move upwardly until it engages the overhanging portion 54; this may not be sufficient to disengage the lower shoe. By providing an adjustable stop the wear of the brake shoe may be compensated for.

An aluminum dust shield 60 is suitably secured to the bracket 11 and the arms 18, 19 and 20 mounted thereon. The outer brake shoes 22 are provided with inwardly extending segmental plates 61, and the dust shield 60 has riveted thereto plates 62 having off-set portions 63 forming slots or recesses. These segmental plates are suitably lined with leather linings 64, 65 or any other noise deadening lining. By means of the above construction the brake shoes are more or less guided in their movements, and noise due to lateral vibration is prevented. The spring 56 is always under tension and holds the upper brake shoe yieldingly in engagement with the adjustable stop 58, and thus provides an additional means for preventing rattling of the upper brake shoe.

It is obvious that various changes may be made in the details of construction without departing from the spirit of this invention, and it is therefore to be understood that this invention is not to be limited to the specific constructions shown.

What I claim is:

1. In a brake mechanism, the combination with a brake drum, of a brake shoe coöperating therewith, a pivot for the shoe and coöperating means on the shoe and pivot forming a bayonet joint.

2. In a brake mechanism, the combination with a brake drum of a brake shoe coöperating therewith, a pivot for the shoe, and coöperating means permitting endwise removal of the shoe when the shoe is in one position and locking the shoe against such movement when in another position.

3. In a brake mechanism, the combination with a brake drum of a brake shoe coöperating therewith, a pivot for the shoe and a support for the pivot, the shoe and support being provided with coöperating lugs forming a bayonet joint.

4. In a brake mechanism, the combination with a support and a relatively rotatable braking surface adjacent thereto, of a brake shoe pivoted to said support and having a projecting lug at its pivoted end, said support having a notch in which said lug engages when the shoe is in operative position.

In testimony whereof I affix my signature in presence of two witnesses.

RUSSELL HUFF.

Witnesses:
J. G. VINCENT,
H. D. CHURCH.